United States Patent [19]

Kennedy et al.

[11] Patent Number: 5,101,539

[45] Date of Patent: Apr. 7, 1992

[54] FOAMED SEAT CUSHION

[75] Inventors: William J. Kennedy, Manchester, N.H.; Peter E. Leach, Royal Oak, Mich.; Larry N. Grogan, Greer, S.C.

[73] Assignee: Velcro Industries B.V., Netherlands

[21] Appl. No.: 593,662

[22] Filed: Oct. 5, 1990

Related U.S. Application Data

[62] Division of Ser. No. 475,687, Feb. 6, 1990, Pat. No. 5,005,242.

[51] Int. Cl.⁵ .............................................. A44B 1/04
[52] U.S. Cl. .......................................... 24/442; 5/481
[58] Field of Search ................... 5/401, 402, 481, 472; 24/306, 442, 450; 297/218, DIG. 6

[56] References Cited

U.S. PATENT DOCUMENTS

| | | | |
|---|---|---|---|
| 4,271,566 | 6/1981 | Perina | 297/DIG. 6 X |
| 4,352,524 | 10/1982 | Crosby | 24/442 |
| 4,679,851 | 7/1987 | Solie et al. | 5/472 |
| 4,709,453 | 12/1987 | Harvey et al. | 24/442 |
| 4,776,636 | 10/1988 | Pyle et al. | 5/472 X |
| 4,794,028 | 12/1988 | Fischer | 24/306 X |
| 4,854,037 | 8/1989 | De Santo | 248/205.2 X |
| 4,863,127 | 9/1989 | Handler | 248/205.2 X |
| 4,884,713 | 12/1989 | Handler | 248/205.2 |
| 4,994,054 | 2/1991 | Digneul et al. | 24/306 X |

FOREIGN PATENT DOCUMENTS 486612 7/1976 Australia ...................... 297/DIG. 6

Primary Examiner—Renee S. Luebke
Assistant Examiner—Michael J. Milano
Attorney, Agent, or Firm—Hayes, Soloway, Hennessey & Hage

[57] ABSTRACT

The present invention is directed to a molded foamed automobile cushion having a deep groove and an upholstery cover secured thereto by a touch fastener having cooperating hook and loop elements carried by the cushion and cover. One element of the touch fastener is molded into a deep groove in the cushion and the other element is secured to the upholstery. The hook elements on both sides of the groove are unidirectional, when assembled, and have their concave surfaces facing in the same direction to permit easy entry of the upholstery into the groove and providing maximum resistance to removal of the upholstery from the groove.

4 Claims, 3 Drawing Sheets

MOLDED CUSHION

FOAMED SEAT CUSHION

This is a divisional of copending application(s) Ser. No. 07/475,687 filed on 2/6/90 now U.S. Pat. No. 5,005,242.

BACKGROUND OF THE INVENTION

In recent years automobile cushions have been formed of foam materials such as polyurethanes which have foamed into their surfaces touch fastening strips which enable the rapid attachment to such cushions of upholstery having cooperative touch fastening elements. Despite this development those seat cushions having deep grooves have used mechanical methods of attaching a cover, such as hog rings and the like, which are expensive and time consuming to employ. So far as is known, the use of touch fasteners for securing upholstery in the deep groove of foam cushions has not been utilized on a commercial scale.

The most relevant prior art showing the use of touch fasteners for securing upholstery in deep grooved cushions is the French Patent Publication No. 2,466,330, published Apr. 10, 1981 (Roth Freres). Other background patents of interest are: U.S. Pat. No. 4,271,566 (June 9, 1981), French Patent Publication 2,405,123 (Nov. 27, 1981), U.S. Pat. No. 4,617,24 (Oct. 14, 1986), U.S. Pat. No. 4,470,857 (Sept. 11, 1984), U.S. Pat. No. 4,693,921 (Sept. 15, 1987), U.S. Pat. No. 4,710,414 (Dec. 1, 1987), U.S. Pat. No. 4,673,542 (Jan. 16, 1987), U.S. Pat. No. 4,726,975 (Feb. 23, 1988), U.S. Pat. No. 4,563,380 (Jan. 8, 1980), U.S. Pat. No. 4,400,336 (Aug. 23, 1983), U.S. Pat. No. 4,420,447 (Dec. 13, 1983), U.S. Pat. No. 4,617,214 (Oct. 14, 1986), and U.S. Pat. No. 4,763,798 (Aug. 16, 1988).

BRIEF SUMMARY OF THE INVENTION

The present invention is directed to the development of products and technology for using touch fasteners to hold upholstery within the deep grooves (e.g. about ½ to 3 inches) of a foamed seat cushion. In general a "deep groove" is one wherein the surface curves through about 90° in less than an inch or two. To accomplish this objective there is provided, in the deep groove, one element of a touch fastener molded into the seat cushion; the other element of the touch fastener is carried by the upholstery. In one preferred embodiment of the invention the touch fastener comprises hook and loop elements. The loops are randomly oriented with respect to the length of the groove and the hooks are aligned so they are generally perpendicular to the length of the groove. The hooks to be used on two opposite sides of the groove face in the same direction.

In the structure of the present invention the hooks are preferably carried by the trim cover. They may be carried by the groove surface in a less preferred form. For convenience, the invention will be initially described in connection with the preferred form of the invention.

In this preferred form an elongated tape, containing the loops on one surface, is mounted on a flexible plastic support for the tape. This support preferably has a pointed ridge over which the center portion of the tape is placed with the loop surface facing the support. The support also has sealing means for holding the lateral edges of the tape to prevent access of the foaming chemicals to the loops carried by the tape. This support also has a means for securing it to the surface of a mold.

In use, the support is mounted in a mold with the pointed ridge extending into the mold volume. When a cushion is foamed around this pointed ridge there will be provided a deep narrow groove whose shape is largely controlled by the shape of the pointed ridge and the remainder of the plastic support. After foam molding, the plastic support is removed from the foamed cushion, leaving the tape attached to the foam. This tape is thus positioned on the facing surfaces of the deep groove in the foam, with the loop fastening elements on both facing surfaces of the tape. The groove is now ready to receive the cooperating hook elements secured to the trim cover.

In this connection, another important feature of the invention is the provision of a tape, to be used for supporting the hook elements, which is secured in an appropriate spot on the cover. This hook tape has, in a preferred embodiment, the hook ends facing away from the center of the tape. Thus, for example, a tape having right and left hand edges will have the hooks on the right hand side facing to the right edge and hooks on the left hand side facing the left edge. When this type of tape is pushed into the groove containing the loops on its surface the hooks, which face upwardly (opposite the direction of insertion), will not engage the loops in the downward motion. However, when the hooks are seated it is only with great difficulty that these hooks can be removed since they securely grab the loops which are, in turn, fastened to the foam.

In order to fully understand the invention, reference should be had to the detailed specification along with the attached drawings wherein.

Figure 4:
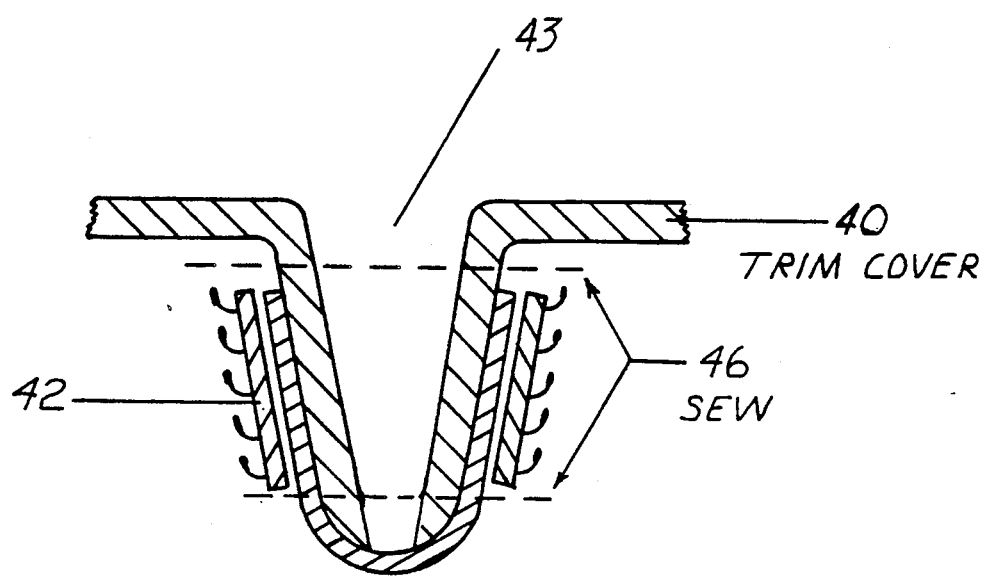

FIG. 4, diagrammatically, illustrates a modified form of the hook tape of the present invention.

Figure 5:
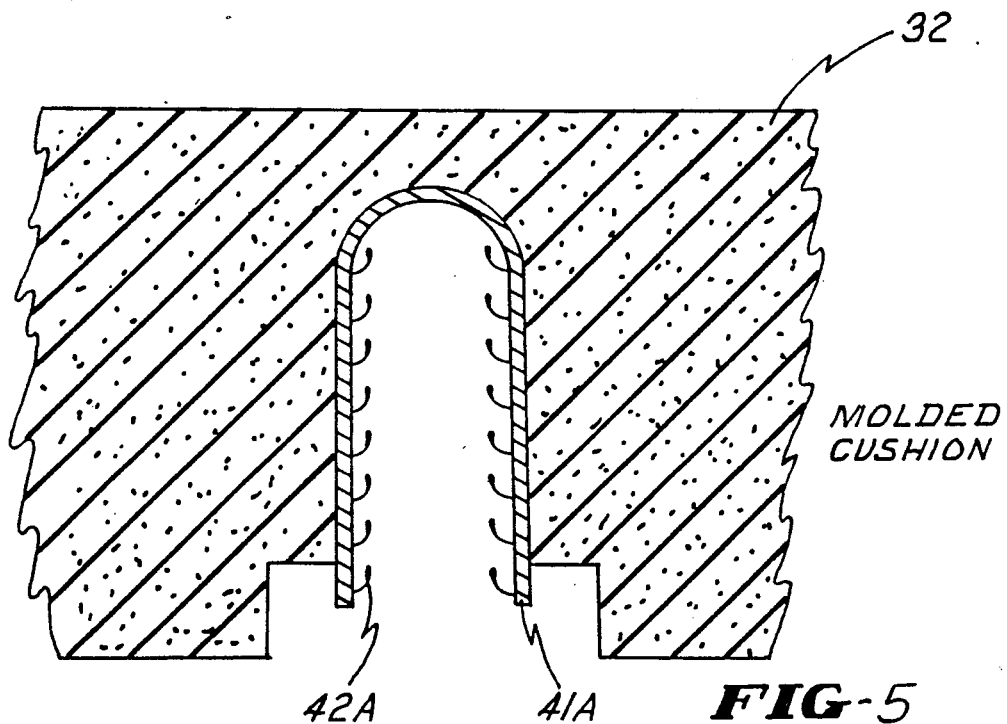
Figure 6:
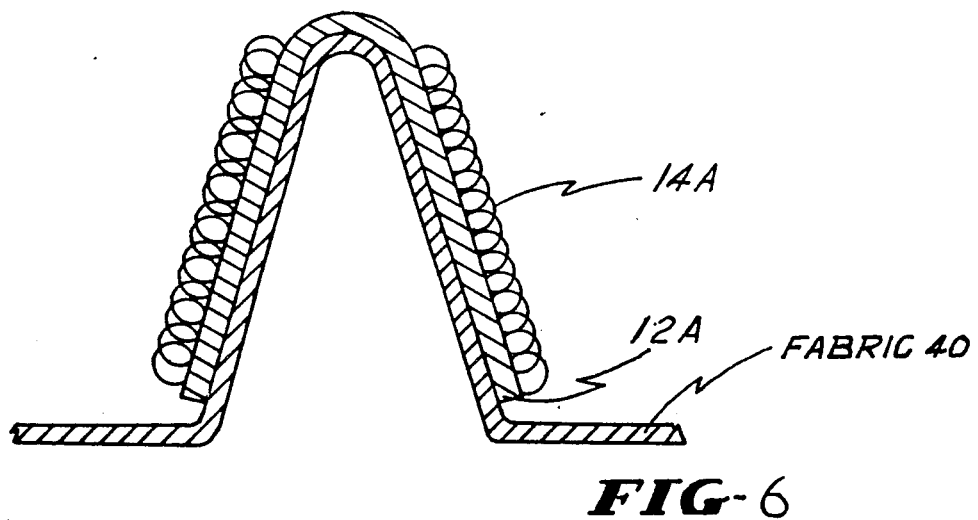

FIGS. 5 and 6 are schematic views of a modification of the invention where the hooks are carried by the cushion and the loops are carried by the fabric forming the trim cover.

Figure 1:
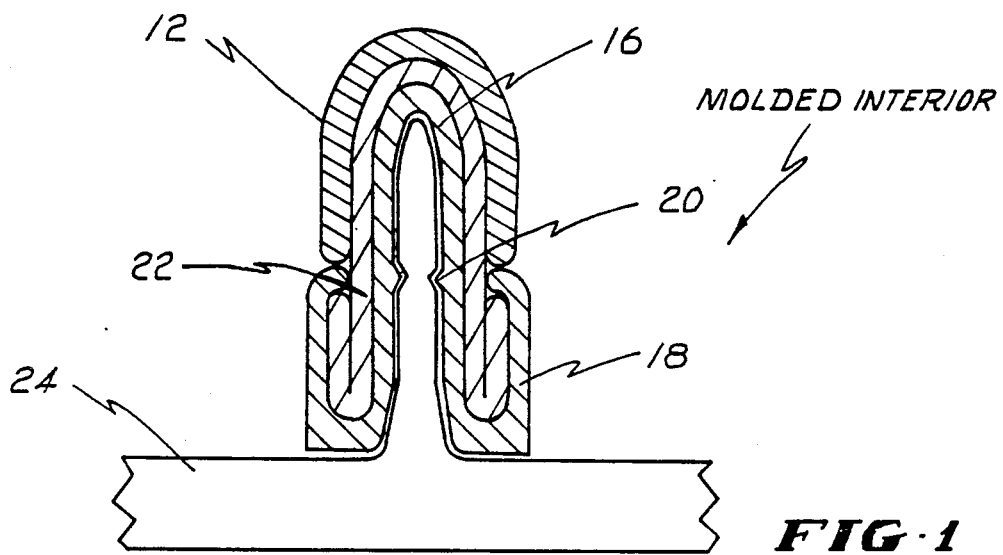
FIG. 1 is a schematic sectional view of a support and loop tape held in position in a foam cushion mold.

Referring now to FIG. 1, there is shown, in enlarged detail, a V-shaped support 10 carrying a tape 12, having loops schematically indicated at 14 (FIG. 2) on one surface thereof. As can be seen, the support 10 has a central ridge portion 16 and outwardly extending legs 18 which form a groove 19 along each side of the support. These grooves 19 terminate in ridges 21 which act to hold and seal the edges of the fastening tape 12. A pair of detentes 20 are carried by the support 10 to engage a corresponding groove 22 carried on stud 23 mounted on the interior of the mold surface 24. This stud 23 can be formed of several pieces screwed into holes appropriately tapped in the mold surface 24 along the line of the cushion groove. Alternatively, stud 23 can be a continuous ridge.

Figure 2:
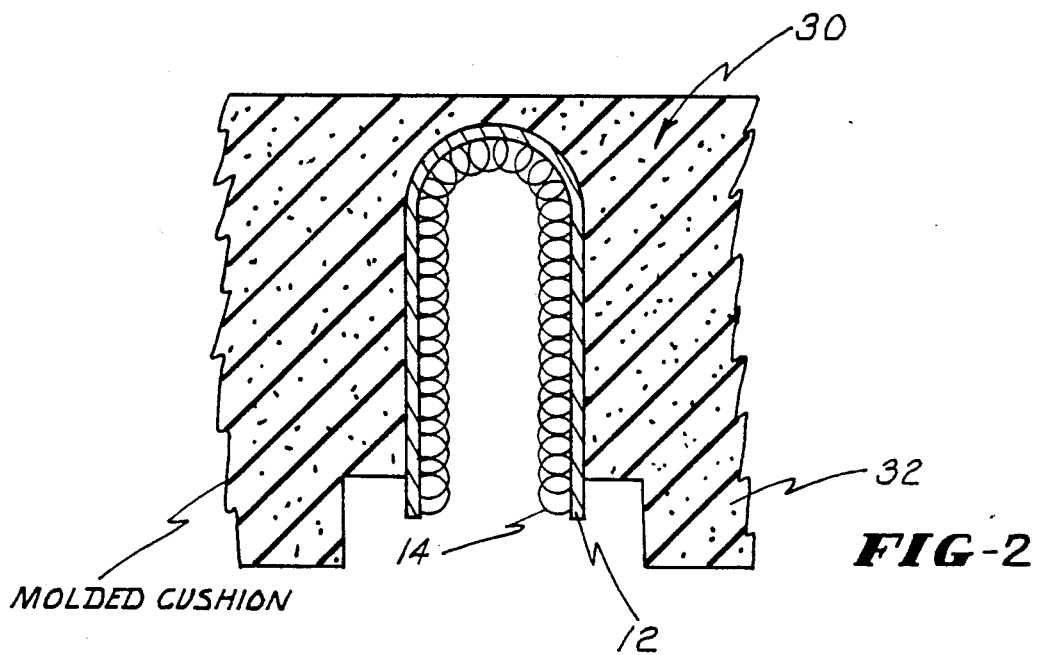
FIG. 2 is a schematic sectional view of a portion of a foamed cushion made according to the invention.

When foam is poured into the mold and solidifies it will form a deep V having the approximate shape of the outside of the tape 12 and the legs 18 holding the tape 12. A finished molded product is shown in FIG. 2 where the loops 14, carried by the tape 12, are shown as extending into the interior of the groove 30 in the foam body 32.

Figure 3:
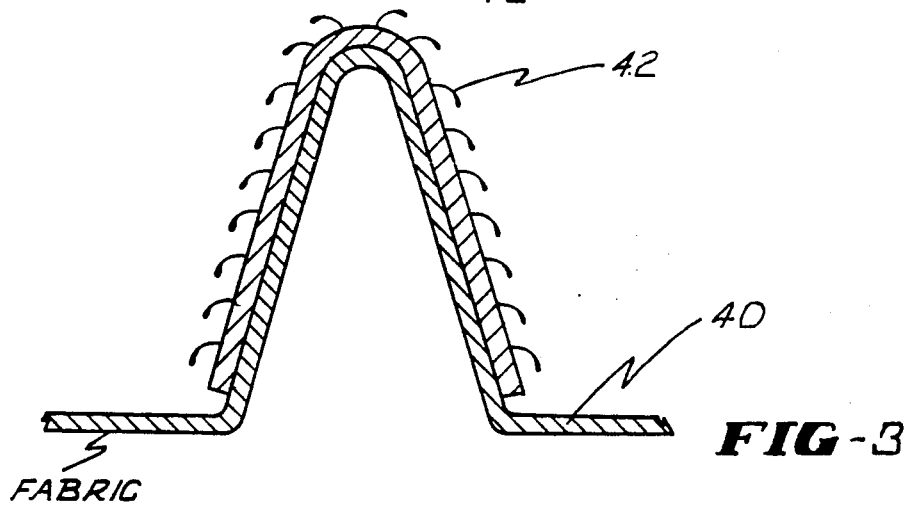
FIG. 3 is a schematic cross-sectional view of a hook tape incorporating the invention.

Shown in FIG. 3 is a trim cover material 40 carrying a tape 41 having one-way hooks 42 on one surface. As can be seen, this tape 41 has all of the hooks facing away from the center of the seam 43 in the trim cover 40. Thus, when the trim cover is jammed into the groove 30 it will easily slide into the groove, since the hooks 42 do not engage the loops 14 on the way in, but do engage them when they are positioned in the bottom of the groove. Accordingly, any effort to remove the seat cover is strongly resisted by the engagement of the one-way hooks 42 with the loops 14 lining the V in the foam.

Thus, an important feature of the invention is the use of the cooperating hook tape having hooks which extend in opposite directions on the two opposite sides of the center of the tape, but extend in the same direction when the tape is bent into a V.

FIG. 4 illustrates a preferred structure of hook tape which can be built up of various molded hook strips 41 by sewing, adhesives or thermal bonding. In FIG. 4 a preferred type of hook strip 41 is made by extruding a series of hooks 42 oriented along the length of the extrusion as shown in Fischer patent 4,775,310. By cutting the extruded strip transversely of the length a series of pieces are produced with hooks oriented toward one edge. These strips are then mounted on a strip of nonwoven scrim 44 such as by sewing, as indicated at 46. The seam in a trim cover is usually made by sewing separate pieces of trim cover 40 forming a seam 43. The scrim 44 carrying the separate hook strips 42 can be secured to the backside of the two pieces of the trim cover 40 at the same time that these edges are sewn together In a preferred form of seam the two edges of trim cover are sewn both above and below the hook strips as shown schematically in FIG. 4 at 46.

FIGS. 5 and 6 show a modification of the invention wherein the hooks 42a are carried by the foam and the loops 41a are carried by the fabric.

The system of the present invention provides for precise molding of complex creased cushions which can be rapidly molded with unskilled labor using preassembled fastening tapes and supports therefor. This tape support structure can be readily manufactured on automatic assembly machines, cut to the requisite length and merely snapped into place on the positioning studs. These studs precisely hold the tape in the mold and the support for the tape seals both the joint at the mold surface and the edges of the tape so that foaming fluids cannot access the inner surface of the tape carrying the loops or hook elements.

In a preferred form of the invention the support 16 is preferably extruded from a melt of polypropylene, which doesn't adhere to the foam. Such an extruded shape can be made partially flexible (it can be bent around a horizontal axis with a large radius of curvature), thus it may accommodate a slightly curved mold surface. If the plastic of the extruded shape is one which tends to adhere to the foam of the seat cushion the plastic shape can be treated with a suitable mold release agent.

The materials normally employed in the commercial manufacture of hook and loop touch fasteners for use with foam-molded cushions, e.g. nylon 6,6 and polyester are used in the present invention.

With the structures shown in FIGS. 1-2, the bond between the loop tape and the foam is greater than the bond between the tape and the support, which, in turn, is greater than the bond between the support and the mold.

The bond between the tape and the foam can be increased as shown in U.S. Pat. Nos. 4,673,542 and 4,710,414 by providing a slightly porous backing for the tape or by having tabs molded into the foam as shown in U.S. Pat. No. 4,726,975. The tape portion to be secured to the trim cover can be attached by adhesives, welding, stitching and the like, as is well known in the art.

We claim:

1. A fastening tape for securing a cloth to a foamed cushion having an elongated groove with loop elements lining the surface of the groove, said tape having hook elements extending from one surface thereto, the hooks on each side of the center of the tape facing in opposite directions with the concave surfaces of the hooks facing toward the closest edge, whereby said hook tape, when folded along its center line, can be inserted into said loop coated groove with ease and can be removed only with difficulty.

2. The tape of claim 1 wherein said hooks are carried by a scrim which is secured to a seam in the cloth.

3. A fastening tape for securing a cloth to a foamed cushion having an elongated groove, said cloth having a surface comprising a loop portion of a loop and hook fastener, said tape having hook elements extending from one surface thereof, the hooks on each side of the center of the tape facing in opposite directions with the concave surfaces of the hooks facing toward the closest edge, whereby said hook tape when foamed in place in groove provides a hook-coated groove into which the cloth can be inserted with ease and withdrawn only with difficulty.

4. A fastening tape for securing a cloth to a foamed cushion having a relatively narrow opening at least partially lined on two sides of the opening with one part of a hook and loop fastener, said tape having hook elements extending from one surface thereof the hooks on each side of the center of the tape facing in opposite directions with the concave surfaces of the hooks facing towards the closest edge, whereby the hooks when carried by said cushion all face inwardly of said opening and when carried by said cover all face outwardly of said opening whereby when said cover, is forced into said narrow opening, the orientation of the hooks permits easy entry of said cover into said narrow opening and strongly resists removal of said cover from said opening.

* * * * *